(12) United States Patent
Palandro et al.

(10) Patent No.: US 11,537,969 B2
(45) Date of Patent: Dec. 27, 2022

(54) HIERARCHICAL RECURSIVE WORKFLOW MANAGEMENT PLATFORM

(71) Applicants: Michael Palandro, Spring Hill, FL (US); Christian Wiggerman, Spring Hill, FL (US); Solomon Baba, Manchester (GB)

(72) Inventors: Michael Palandro, Spring Hill, FL (US); Christian Wiggerman, Spring Hill, FL (US); Solomon Baba, Manchester (GB)

( * ) Notice: Subject to any disclaimer, the term of this patent is extended or adjusted under 35 U.S.C. 154(b) by 0 days.

(21) Appl. No.: 16/509,187

(22) Filed: Jul. 11, 2019

(65) Prior Publication Data

US 2021/0012252 A1    Jan. 14, 2021

(51) Int. Cl.
*G06Q 10/06*    (2012.01)

(52) U.S. Cl.
CPC ... *G06Q 10/0633* (2013.01); *G06Q 10/06312* (2013.01); *G06Q 10/06316* (2013.01)

(58) Field of Classification Search
CPC ......... G06Q 10/0633; G06Q 10/06312; G06Q 10/06316

(Continued)

(56) References Cited

U.S. PATENT DOCUMENTS 6,049,799 A * 4/2000 Mangat ............... G06F 16/9024
6,208,345 B1 * 3/2001 Sheard .................... H04L 67/36
715/853

(Continued)

OTHER PUBLICATIONS

Gregory et al "Modelling business processes with workflow systems: an evaluation of alternative approaches", Dec. 2001, International Journal of Information Management. pp. 123-135 (Year: 2001).*

(Continued)

*Primary Examiner* — Romain Jeanty
(74) *Attorney, Agent, or Firm* — McKinney Phillips LLC

(57) ABSTRACT

A hierarchical recursive workflow management platform is a downloadable application presented through a browser or application user interface and stored for use on a personal electronic device. The hierarchical recursive workflow management platform may have a mobile application; and, can have an integrated architecture in which the internal components of the personal electronic device may be able to access a secondary application, local or remotely located on a server containing stored data for implementation. A common user interface screen, providing the user an interface, may access all the functionalities and activities offered by the platform through either the computer, mobile application or the secondary application by accessing the internal components of the personal electronic device to exchange such information, pertinent to the hierarchical recursive workflow management platform. Providing a hierarchical recursive workflow management platform; which manages, tracks, executes and adjust as required; a workflow plan, both horizontally and vertically hierarchical with the capability to apply a recursive dynamic through the conversion of tasks/deliverables (cards) respectively to boards; and furthermore, to re-convert a board comprised of cards back to its original card it was converted from; or, implement a pause status to the card activities associated with a board; as well as, delete a board, comprised of cards. The unique functionalities presented herewith, more closely aligns with efficient workflow management by providing real time visibility and hierarchical permissions to better understand; overall status, progress, needed adjustments and areas of activity where corrective solutions may be required to a workflow activity at all levels.

4 Claims, 3 Drawing Sheets

(58) Field of Classification Search
USPC .......................................................... 705/7.38
See application file for complete search history.

(56) References Cited

U.S. PATENT DOCUMENTS

| | | | | |
|---|---|---|---|---|
| 6,430,538 | B1* | 8/2002 | Bacon | G06Q 10/06316 |
| | | | | 705/7.21 |
| 6,526,426 | B1* | 2/2003 | Lakritz | G06F 40/197 |
| | | | | 715/264 |
| 6,621,505 | B1* | 9/2003 | Beauchamp | G06Q 10/10 |
| | | | | 715/700 |
| 2004/0078373 | A1* | 4/2004 | Ghoneimy | G06Q 10/10 |
| 2014/0351115 | A1* | 11/2014 | Dahiwadkar | G06Q 10/06 |
| | | | | 705/38 |
| 2016/0306683 | A1* | 10/2016 | Standley | G06F 9/4843 |

OTHER PUBLICATIONS

Richard "Recursive Workflows in Dynamics CRM", 2010, pp. 1-7 (Year: 2010).*

* cited by examiner

HIERARCHICAL RECURSIVE WORKFLOW MANAGEMENT PLATFORM

FIELD OF DISCLOSURE

The present disclosure generally relates to a hierarchical recursive workflow management platform, which comprises a system to identify and implement a workflow plan and to manage, track, execute and adjust as required; both horizontally and vertically hierarchical with the capability to apply a recursive dynamic through the conversion or linking of tasks/deliverables (cards) respectively to boards while still existing as both a card and a board, as the complexity of the tasks/deliverables requires. The iteration of the card(s) conversion created through the platform's recursive capability; can be continuously performed on an infinite basis, augmenting the noted flows of work activities while reporting progress and actions back up the hierarchy.

BACKGROUND OF THE DISCLOSURE

The platform is accessed through a downloadable application; stored in memory of a computer and being a non-transitory storage medium stored within a memory of a personal electronic device of a user; a secondary application being stored within the memory of the personal electronic device of a user; an integration architecture, the integration architecture being able to access the memory and internal components of the personal electronic device and connect the secondary application to be accessed within the computer and mobile application; and, a user interface screen providing the user an interface may access all the functionalities and activities offered by the platform through either the computer, mobile application or the secondary application by accessing the internal components of the personal electronic device to exchange such information.

The platform is based upon known methodologies and frameworks associated with managing projects and workflows. These methodologies and frameworks include the use of boards, lists and cards to track and manage horizontal workflows. The platform employs a greater dynamic, in that it allows for the management of vertical workflows, as well as horizontal. The platform's hierarchical structure includes the unique functionality of being recursive throughout the management of the workflow processes with infinite capabilities.

The recursive capability included in the platform allows for the conversion of tasks/deliverables which are viewed as cards in the workflow to the status of becoming a board, this nesting aspect is an integral part of the recursive capability. A board can contain innumerable lists and cards. Cards are created inside lists, while lists represent a workflow pattern to move the cards from one position to another inside a board.

A board represents a level where different sets of activities are created, managed and tracked while the cards represent work deliverables/tasks needed for execution; while a list represents the steps and workflow process necessary to complete these deliverables/tasks. The platform is centered on the recursion of cards into new boards. This will pertain to an existing deliverable/task, at a certain level in the workflow which may require further management as a new set of activities, requiring specific tracking; and to accomplish this need a new board is created from that card, representing a certain deliverable/task. This recursive capability, to be able to convert cards to boards, will allow organizations to better define; and, uniquely link related boards comprising deliverables/tasks (cards), by providing more granularity for that position of the workflow activities. The infinite recursive ability offered by the platform, can be used as required by the workflow; in order to, provide more granularity, greater ease to execute activities and better visibility to understand project status throughout the hierarchy displayed by the platform. The platform acts as a one solution catalyst, binding all activities included within the hierarchy of the workflow being performed.

Furthermore; new boards created through the platform's recursive ability, which comprise the required tasks/deliverables (cards); however, can be re-converted back into the original card (task/deliverable) it was created from, as an adjustment to the workflow necessitates. This looping function is completely unique to existing workflow management platforms. In addition, the platform allows for the tasks/deliverables associated with the newly created or existing board, comprised of cards, to be either put into a pause status; or, completely deleted from the workflow structure. Deletions can be conducted at all levels of workflow activity except at the root level, which is the workflow's originating board, comprising cards. The platform's functionality to pause or delete boards, comprised of cards, is also completely unique to existing workflow management platforms.

The advantage presented by the uniqueness of the platform's recursive capability and hierarchy structure, include administrative authorities equating to the organizational structures presented by the specific workflow. The highest level of administration would have complete dashboard visibility from top to bottom of the workflow structure; whereas, each successive lower administrative position would have dashboard visibility to activities downstream from their point of administration in the hierarchy structure. Therefore, responsibilities for all aspects of the workflows are identifiable to all appropriate levels of concerned parties, giving all participants the ability to be vigilant to notice and resolve problems before they ameliorate into a roadblock event in the process flow. Negative time and financial implications can be mitigated immediately.

SUMMARY OF THE DISCLOSURE

Accordingly, a downloadable application; stored in memory of a computer or server and being a non-transitory storage medium stored within a memory of a personal electronic device of a user; a secondary application being stored within the memory of the personal electronic device of a user; an integration architecture, the integration architecture being able to access the memory and internal components of the personal electronic device and connect the secondary application to be accessed within the computer and mobile application; and, a user interface screen providing the user an interface may access all the functionalities and activities offered by the platform through either the computer, mobile application or the secondary application by accessing the internal components of the personal electronic device to exchange such information.

The platform is based upon known methodologies and frameworks associated with managing projects and workflows. The platform employs a greater dynamic, in that it allows for the management of vertical workflows, as well as horizontal. The platform's hierarchical structure includes the unique functionality of being recursive throughout the management of the workflow processes with infinite capabilities.

With specific regard to the functionality of the platform, the recursive capability included in the platform allows for the conversion of tasks/deliverables which are viewed as cards in the workflow to the status of becoming a board, this nesting aspect is an integral part of the recursive capability.

Further consideration of the recursive functionality, the platform is centered on the recursion of cards (deliverables/tasks) into new boards. This will pertain to an existing deliverable/task, at a certain level in the workflow may require further management as a new set of activities, requiring specific tracking; and to accomplish this need a new board is created from that card, representing a certain deliverable/task. This recursive capability, to be able to convert cards to boards, will allow organizations to better define; and, uniquely link related boards comprising deliverables/tasks (cards), by providing more granularity for that position of the workflow activities. The infinite recursive ability offered by the platform, can be used as required by the workflow; in order to, provide more granularity, greater ease to execute activities and better visibility to understand project status throughout the hierarchy displayed by the platform. The platform acts as a one solution catalyst, binding all activities included within the hierarchy of the workflow being performed.

New boards created through the platform's recursive ability, which comprise the required tasks/deliverables (cards); however, can be re-converted back into the original card (task/deliverable) it was created from, as an adjustment to the workflow necessitates. Additionally, the platform allows for tasks/deliverables (cards), associated with newly created or existing board, comprised of cards, to be either put into pause status; or, completely deleted from the workflow structure. Deletions can be conducted at all levels of workflow activity except at the root level, which is the workflow's originating board, comprising cards. The above noted functionalities, comprised: re-conversion, pause and deletion are completely unique to existing workflow-management platforms.

Due accord to the platform's recursion capability includes, a defined hierarchy structure, which includes administrative authorities equating to the organizational structures presented by the specific workflow. The highest level of administration would have complete dashboard visibility from top to bottom of the workflow structure; whereas, each successive lower administrative position would have dashboard visibility to activities downstream from their point of administration in the hierarchy structure. Therefore, responsibilities for all aspects of the workflows are identifiable to all appropriate levels of concerned parties, giving all participants the ability to be vigilant to notice and resolve problems before they ameliorate into a roadblock event in the process flow. Negative time and financial implications can be mitigated immediately.

These and other aspects and features will be better elucidated and understood when taken in conjunction with the following drawings.

It should be understood, that the drawings are not necessarily to scale and that the disclosed embodiments are illustrated diagrammatically and in partial views. It should be further understood, that this disclosure is not to be limited to the distinct embodiments illustrated herein.

DETAILED DESCRIPTION OF THE DISCLOSURE

Figure 1:
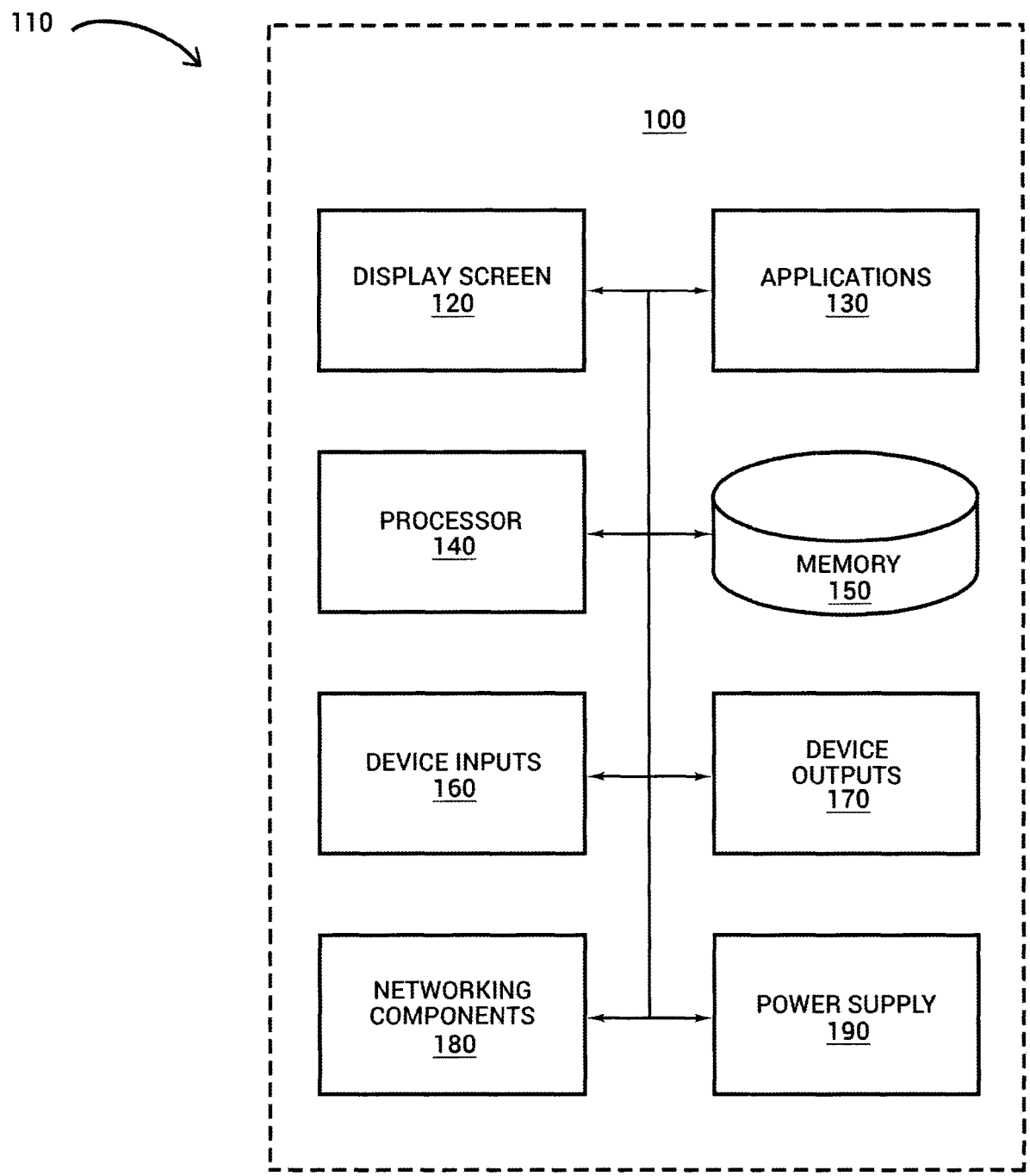
FIG. 1 is a schematic view of the internal components of a personal electronic device constructed in accordance with an embodiment of the present disclosure.

Referring now to FIG. 1, a personal electronic device 100 is depicted upon which the hierarchical recursive workflow management system 110 can be accessed. In the illustrated embodiment, the components of the personal electronic device 100 include a display screen 120, applications (e.g. programs) 130, a processor 140, a memory 150, one or more device inputs 160, and one or more device outputs 170. The personal electronic device 100 may be a mobile device, such as a smartphone, a laptop computer, a tablet computer (or pad), an electronic book (eBook reader, or other mobile or personal electronic devices that may be used to communicate wirelessly (or via a fixed link) and allow the user to view and share information. Moreover, the personal electronic device 100 may also be any computer, such as a desktop computer, or processor-based device that may use fixed (or wireless) links to communicate with other components and devices.

The display screen 120 may be connected to the processor 140 and memory 150 of the personal electronic device 100. When a user accesses the personal electronic device 100, the display screen 120 may visually represent the encoded software of the operating system of the personal electronic device 100 saved within the memory 150. Additionally, the display screen 120 may visually show the applications 130 accessed by the user which also may be stored within the memory 150 of the personal electronic device 100. The display screen 120 may have the added benefit of being operable as a device input 160. As a device input 160 the display screen 120 may respond to the touch of a user or a stylus to allow the user to input information into the personal electronic device 100 regarding the operation of programs or applications 130 stored within the personal electronic device 100. Additionally, as a device input 160, the display screen 120 may be able to scan and recognize a user's fingerprints, if a user places their finger within a certain portion of the display screen 120 for recognition and input.

The processor 140 can be any of a microprocessor, microcomputer, application-specific integrated circuit, or the like. For example, the processor 140 can be implemented by one or more microprocessors or controllers within an integrated circuit design. Similarly, the memory 150 may reside on the same integrated circuit as the processor 140. The memory 150 may include a random-access memory (i.e., Synchronous Dynamic Random Access Memory (SDRAM), Dynamic Random-Access Memory (DRAM), RAMBUS Dynamic Random Access Memory (RDRM) or any other type of random-access memory device or system). Additionally, or alternatively, the memory 150 may include a read only memory (i.e., a hard drive, flash memory or any other desired type of memory device).

The information that is stored by the memory 150 can include program code associated with one or more operating systems or applications 130 as well as informational data. Although the memory 150 is usually located locally within the personal electric device 100, the memory 150 may be accessed by the networking components 180 if it is located remotely on a network server or cloud-based computing component. The operating system and applications 130 are typically implemented via executable instructions stored in a non-transitory computer readable medium within the memory 150 to control basic functions of the personal electronic device 100. These functions may include interaction among various internal components of the personal electronic device 100 and storage and retrieval of applications 130 and data to and from the memory 150.

With respect to the applications 130 stored within the memory 150, these typically utilize the operating system to provide more specific functionality. In an embodiment of the present disclosure, the hierarchical recursive workflow management system 110 may be a mobile application located within the memory 150 of the personal electronic device 100. Many applications 130 stored within the memory 150 may provide standard or required functionality of the personal electronic device 100. However, in other cases applications 130 such as the hierarchical recursive workflow management system 110 of the disclosure provide optional or specialized functionality, and may be supplied by third party vendors.

As stated above the personal electronic device 100 may have a device input 160 and a device output 170. Examples of the device input 160 and device output 170 may include a touch screen or a physical keyboard, a stylus, a microphone, a camera, a speaker, wireless interface, infrared interfaces, and/or other input/output interfaces which may be present on the personal electronic device 100. A user may input information through the device input 160 which would then be sent to the processor 140 and memory 150 to execute the inputted information. Furthermore, the device output 170 may produce the required output, either visually or audibly, dependent on the execution of the applications 130 or commands executed by the processor 140 of the personal electronic device 100.

Furthermore the personal electronic device 100 may include software and hardware networking components 180 to allow communications to and from the personal electronic device 100. The personal electronic device 100 may have one or more wireless access technologies or interfaces, such as a chip or component, to enable the personal electronic device 100 to establish a fixed or wireless link to an outside network. Additionally, the personal electronic device 100 may have one or more wireless technology interfaces that may communication with one or more of the other components of the personal electronic device 100. The wireless technologies and interfaces that may be used by the corresponding components of the personal electronic device 100 may include a Bluetooth interface, and Institute of Electrical or Electronic Engineers (IEEE) 802.11 compliant (or Wi-Fi) wireless interface, a near field communication (NFC) link, an Infrared Data Association interface, a Radio-Frequency identification interface or a radio frequency transponder, a reflection antenna chip, cellular interface, and or any other wireless technology interface that may be applicable to the personal electronic device. These networking components 180 provide wireless networking functionality, although wired networking may additionally or alternatively, be supported.

Moreover, a power supply 190, such as a battery or fuel cell, may be included for providing power to the personal electronic device 100 and its components. All or some of the internal components communicate with one another by way of one or more shared or dedicated internal communication links 195, such as an internal bus. Through these internal communication links 195, power and data may be shared between the multiple internal components of the personal electronic device 100.

In an operational setting, the personal electronic device 100 is programmed such that the processor 140 and memory 150 interact with the other components of the personal electronic device 100 to perform a variety of functions. The processor 140 may communicate with the memory 150 to implement various modules and execute programs for different activities such as launching an application, transferring data, and toggling through various graphical user interface objects representing thumbnail images of executable programs stored within the memory 150.

Figure 2:
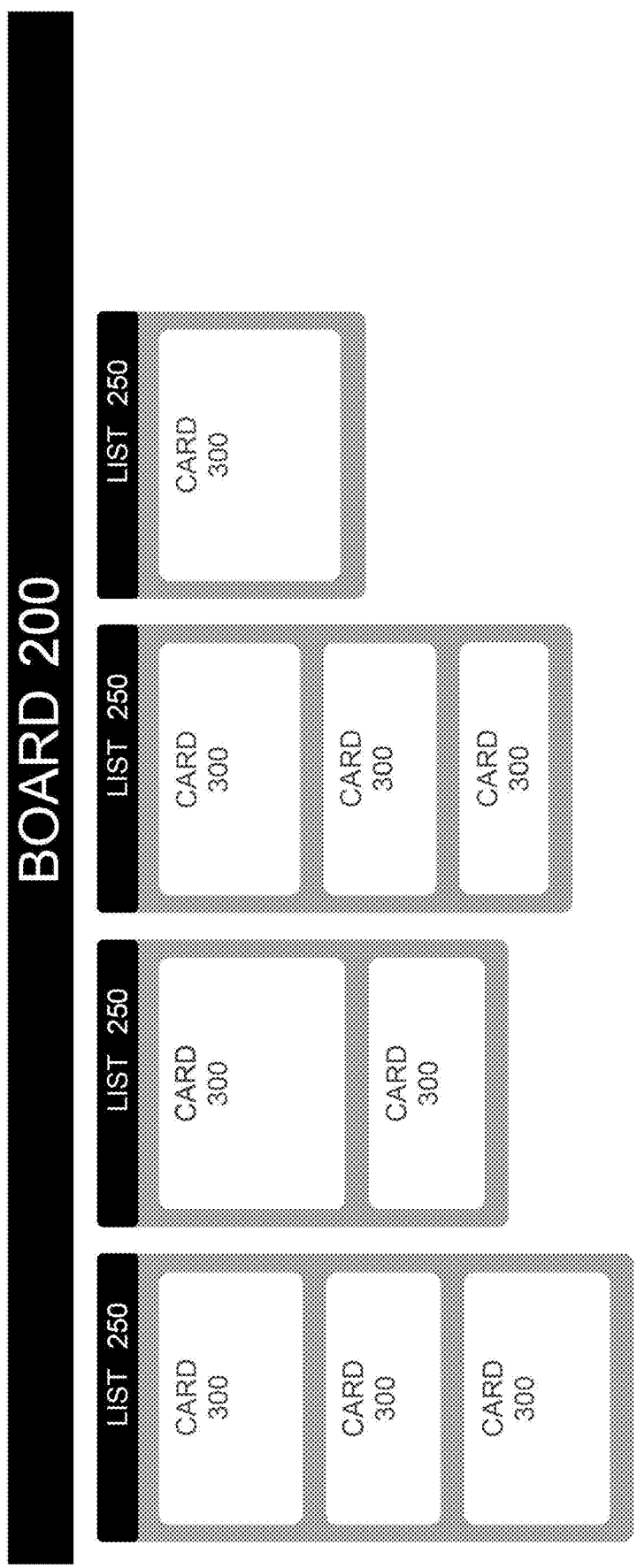
FIG. 2 depicts boards/lists/cards in a horizontal format in accordance with Summary of Disclosure.

Referring now to FIG. 2, a typically standard horizontal workflow board 200 which identifies a certain required workflow that needs to be completed. A workflow board can be identified by the name of a specific workflow planned to be completed. The workflow board 200 is comprised of lists 250. The lists 250 columns identify the processing stages of required workflows determined to be completed. The processing stages of lists 250 can be respectfully identified, for example; as planning, to do immediately, subsequent follow up processing and completed processing stage. The cards 300 respectfully noted under each list 250 column, at board 200, represent tasks/deliverables identified as requirements to be accomplished as associated with each respective list 250. Each card showing a specific task/deliverable can also show specific instructions/processes needed to be completed to successfully complete each task/deliverable, in order to horizontally move the representative card 300 to the next successive list 250 in the workflow process.

The platform distinguishes itself from all other workflow applications, in that; although it initially identifies boards/lists/cards horizontally, the platform has the unique capability to convert cards 300 (tasks/deliverables) into boards, 200 being linked and simultaneously existing as both a card 300 and a board 200. The need for this conversion process could be required due to complexity at that distinct stage of the workflow process where accomplishing a noted task/deliverable would not be adequate to successfully complete a workflow process step. Therefore; a determination would have been made to add a more sophisticated process steps requiring a specific workflow, board 200, inclusive of lists 250 and cards 300 (tasks/deliverables), by converting a complex task/deliverable (card 300) into a new board 200, in order to satisfy the needs of that stage of the workflow. The platform allows this conversion step to be conducted infinitely and continuously as required by noted complexities within the workflow process. Additionally, the ensuing workflow process can be displayed vertically in a hierarchical format as organizational trees depicting sections/stages of the workflow process. This aspect of the platform will be further described at the detailed description of the disclosure for FIG. 3.

Figure 3:
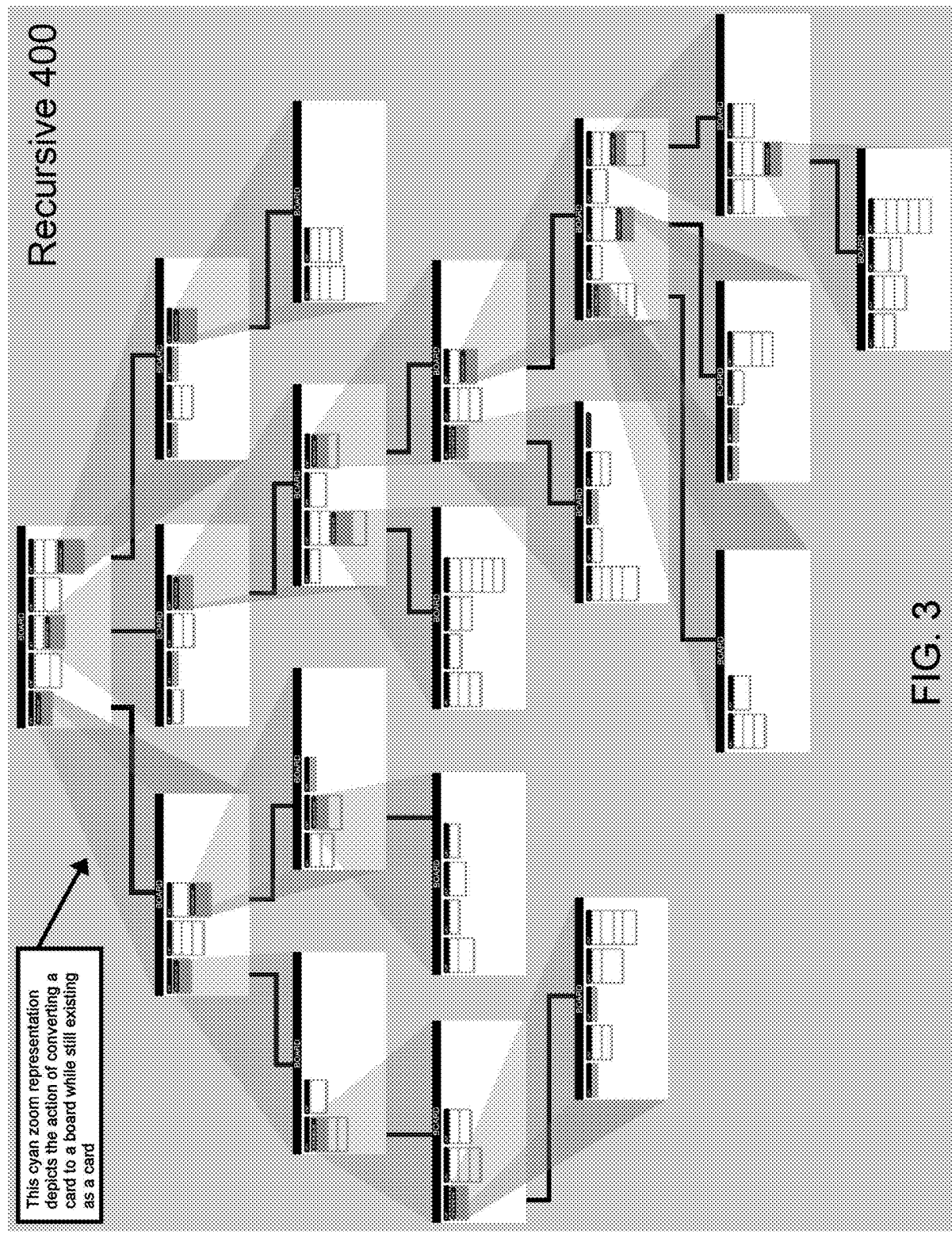
FIG. 3 Illustrates recursive workflow for managing vertical hierarchy created from boards/lists/cards shown at FIG. 2 which depicts workflow horizontally in accordance to Summary of Disclosure.

Referring now to FIG. 3, noted as Recursive 400, vertically shows a multitude of workflow process stages recursively developed to complete an initially required workflow to be accomplished. The Recursive 400 diagram depicts how required task/deliverable conversions to new boards/lists/cards would be represented (shown as cyan colored activity at FIG. 3) by the platforms capability to provide a vertical hierarchy of organizational trees for specific workflow processes. Workflow process granularity is also noted in a hierarchical downstream flow, from top (administrative) to bottom (non-administrative), via dashboards respectively available to all responsible parties involved in the workflow process, in conjunction, and by authority, with their specific stages of concern. The ability to observe the workflow process at all stages of work activity will allow for full ongoing scrutiny, ensuring top to bottom vigilance of the workflows; therefore, determinations can be made as to whether the workflow is progressing properly and timely.

Discrepancies in the workflow process, when identified can be subject to immediate plan(s) of action to correct. This can equate to cost and time savings at every interactive level of the workflow. The platforms ability to produce the conversion events are recursive and with the ability to be conducted infinitely and continuously as required. These conversions, as required, may extend cards 300 (tasks/deliverables) to outside vendors, who are responsible for example; for supplies or services at that distinct workflow process activity.

What is claimed is:

1. A hierarchical recursive workflow platform, which comprises a system to identify and implement a workflow plan and to manage, track, execute and adjust as required, information through the offered functionalities presented by the platform as conducted by user interface through the technical architecture of the platform, comprising:
   a downloadable application; stored in memory of a computer or server and being a non-transitory storage medium stored within a memory of a personal electronic device of a user;
   a secondary application; being stored within the memory of the personal electronic device of a user; an integration architecture; being able to access the memory and internal components of the personal electronic device and connect the secondary application to be accessed within the computer and mobile application; and,
   a user interface screen for accessing all the functionalities and activities offered by the platform through either the computer, mobile application or the secondary application by accessing the internal components of the personal electronic device to exchange such information, wherein the platform includes infinite recursive capability of converting cards (tasks/deliverables) into or linking to new boards comprising cards (tasks/deliverables) showing required workflow activity; and: the ability to re-convert new and existing boards, comprised of cards (tasks/deliverables) back into the original card (task/deliverable) it was converted from; and: functionality to delete boards, comprised of cards (tasks/deliverables); further, the ability to pause activity(ies) noted on cards (tasks/deliverables) within a board.

2. A hierarchical recursive workflow management platform according to claim 1, provides both horizontal and uniquely vertical hierarchical structure of workflows which links workflow related boards, comprised of cards (tasks/deliverables).

3. A hierarchical recursive workflow management platform according to claim 1, is a platform that offers a comprehensively unique advanced dynamic by presenting the workflow's boards and associated cards (tasks/deliverables) in a hierarchical organized tree format (FIG. 3: Recursive 400 diagram), depicting boards and cards (tasks/deliverables) as they are linked, related to the level of associated workflow activity.

4. A hierarchical recursive workflow management platform according to claim 1, establishes top to bottom workflow administration propriety consummate with the hierarchy of workflows vertically presented by the organized tree format of linked boards, comprised of cards (tasks/deliverables), dashboard visibility permissions to workflow activities are administered in a cumulative downstream direction, pertinent to the level of administrative authority represented at the organized tree hierarchy of workflow activity (boards and cards).

\* \* \* \* \*